(12) United States Patent
Lew et al.

(10) Patent No.: US 11,940,140 B2
(45) Date of Patent: Mar. 26, 2024

(54) LIGHT TRANSMISSIVE FIBER INTEGRATED KNIT TEXTILE

(71) Applicants: AUSSCO HONG KONG LTD, Hong Kong (HK); INDHOUSE LIMITED, Hong Kong (HK)

(72) Inventors: Christine Lew, Hong Kong (HK); Jackson Chow, Hong Kong (HK); Tiffany Williams, Hong Kong (HK); Vince Ho, Hong Kong (HK); Wen Ke Xi, Hong Kong (HK)

(73) Assignees: AUSSCO HONG KONG LTD, Hong Kong (HK); INDHOUSE LIMITED, Hong Kong (HK)

( * ) Notice: Subject to any disclaimer, the term of this patent is extended or adjusted under 35 U.S.C. 154(b) by 0 days.

(21) Appl. No.: 18/078,068

(22) Filed: Dec. 8, 2022

(65) Prior Publication Data

US 2023/0184423 A1    Jun. 15, 2023

Related U.S. Application Data

(60) Provisional application No. 63/287,575, filed on Dec. 9, 2021.

(51) Int. Cl.
*F21V 33/00* (2006.01)
*D03D 15/547* (2021.01)
*F21V 8/00* (2006.01)
*F21W 121/06* (2006.01)

(52) U.S. Cl.
CPC ....... *F21V 33/0008* (2013.01); *D03D 15/547* (2021.01); *G02B 6/001* (2013.01); *F21V 2200/10* (2015.01); *F21W 2121/06* (2013.01)

(58) Field of Classification Search
CPC ..... F21V 33/0004; F21V 33/008; D03D 1/00; D03D 1/0088; G02B 6/001; G02B 6/0008
See application file for complete search history.

(56) References Cited

U.S. PATENT DOCUMENTS

| 2015/0342307 | A1* | 12/2015 | Weber | D03D 1/00 362/559 |
| 2018/0328071 | A1* | 11/2018 | Wang | E04H 15/10 |
| 2019/0344477 | A1* | 11/2019 | Huffa | B29B 11/16 |
| 2021/0204666 | A1* | 7/2021 | Hsu | G02B 6/001 |
| 2021/0207790 | A1* | 7/2021 | Hsu | D03D 15/547 |

* cited by examiner

*Primary Examiner* — Tracie Y Green
(74) *Attorney, Agent, or Firm* — Bradley Arant Boult Cummings LLP; Jacob W Neu; Lucas R. Yordy (57) ABSTRACT

Disclosed herein is a light transmissive fiber integrated knit textile for use on consumer electronic products. The knit textile is depicted to be constructed with light transmissive fibers integration through a weave-in/inlay knit technique with a flat-bed knitting construction. The light transmissive knitted textile is also tethered to a portable electronic device, allowing for the light transmitting fibers knitted into the fabric to define a lighting display on said fabric.

10 Claims, 13 Drawing Sheets

LIGHT TRANSMISSIVE FIBER INTEGRATED KNIT TEXTILE

TECHNICAL BACKGROUND

The present disclosure relates generally to the construction of a light transmissive fiber integrated knit textile, its components, and its interaction with a light source.

Disclosed herein is a light transmissive fiber integrated knit textile for use on consumer electronic products. The knit textile is depicted to be constructed with light transmissive fiber integration through a weave-in/inlay knit technique with a flat-bed knitting machine.

BACKGROUND OF THE INVENTION

The present invention generally relates to light transmissive knitted textile and methods for producing same. More specifically, this invention relates to light transmissive fibers integrated in a knitted construction.

The present invention is constructed in a flat-bed knitting fabrication method. One of the many capabilities of knitting, includes knitting to shape, which allows for the reduction of waste. Knitting also allows for more programming and machine-controlled fabrication which eliminates certain human error.

Light transmissive fibers have been used in many devices and materials. These fibers may comprise a core and a cladding material. The core may comprise of glass or plastic resin. The cladding material may include glass, plastic, or air. The efficiency of light propagation through the light transmissive fiber may be a function of the difference in refractive index between the core and the cladding.

Light may be introduced at one end of a light transmissive fiber. As the light travels through the fiber, a portion of the light may escape or leak through the sides of the fiber before reaching the end of the fiber. This leakage may be due to light rays exceeding the critical angle for internal reflection. This critical angle may be different for different points along the fiber. Bends in the fiber and scratches on the fiber surface may increase the light leakage at those points.

Modern consumer electronic devices include many that are portable and may be carried by a user where they may have removable straps, functional tethers or decorative tethers. These tethers/bands are generally decorative and serve no useful information providing, or other utilitarian function other than for aesthetic purposes.

SUMMARY OF THE INVENTION

It is an object of the present invention to provide a fabric which can be incorporated or utilized in consumer electronic goods, and which includes capabilities such as light display and acts as a flexible information infrastructure.

The disclosed embodiments relate to fabric materials formed from fibers, and to ways in which to form light transmissive knitted fabric materials to be used with electronic devices.

The fabric of the present invention is a knitted fabric, including light transmissive fiber integration for receiving and transmitting information. The fabric consists of base yarns and the optical fibers. The preferred optical yarn component is a sheathed plastic optical fiber. Optionally, the light transmissive knitted textile may include different base yarns to enhance various functions of the fabric, such as adding stretch through the addition of stretch/elastic yarns or a smooth and more robust surface by utilizing thermoplastic polyurethane (TPU) yarns. Additionally, brightness of the optic fiber performance may also be enhanced by creating larger bending angles on the fiber optic yarns, once integrated through the flat-bed knitting weave-in/inlay technique.

The disclosed embodiments incorporate light transmissive fibers into knitted fabric such as a tether or band, used with an electronic device. The light transmissive fibers receive light from a light source in the electronic device at the point of connection of the fabric to the electronic device such that the light transmissive fibers can function as an electronic display on the textile. The light transmissive fibers may be knitted into a flexible material to create a pliable display which may be worn by the user and could provide certain information.

In some respects the disclosed embodiments are directed in part to a textile having a plurality of yarns knitted into a fabric, the plurality of yarns further having at least one light-transmissive yarn defining a light transmissive portion of the fabric; and a connection for connecting a light source to provide light to the at least one light-transmissive yarn.

In additional respects the disclosed embodiments are directed in part to a textile having a plurality of yarns knitted into a fabric, the plurality of yarns further having at least one light-transmissive yarn, at least one complementary base yarn having an end, and at least one complementary stretch yarn defining a light transmissive portion of the fabric; and a connection attached to the end of the at least one light-transmissive yarn for connecting a light source to provide light to the at least one light-transmissive yarn.

In additional respects the disclosed embodiments are directed in part to a method of manufacturing a textile on a flatbed knitting machine, flatbed are horizontal needle beds where the yarn is moved across the needle bed within feeders. Through a weave-in or inlay knit technique, the fiber optic yarn is integrated into the knit textile which is comprised of complementary base yarns using a single transfer motion to knit the plurality of yarns into a textile.

DETAILED DESCRIPTION

Figure 1:
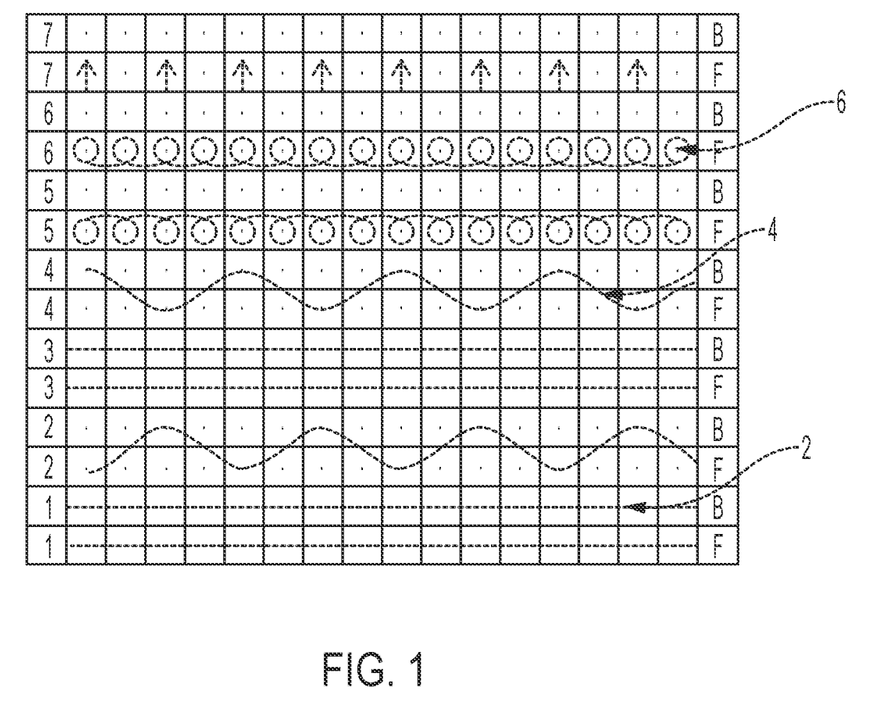
FIG. 1 depicts a knit diagram for an embodiment of a textile having an integrated light-transmissive yarn or fiber optic yarn.

FIG. 1 depicts a knitting diagram for a fiber optic integrated knit textile, where fiber optic light-transmissive fiber 2 is seen in row 1, the complementary stretch yarn 4 in rows 2 and 4 and the complementary base yarn 6 seen in rows 5 and 6. The diagram shows the different yarns utilized in different rows of the knit textile and also whether the yarn is seen on the front side of the knit, 'labelled F' or the back side of the knit, 'labelled B.' As depicted in FIG. 1, the fiber optic yarn 2 as seen in rows 1 and 3 are seen on both the front and back. The upward arrows indicate the passage of the needle front and back in a single transfer motion. This construction features a weave-in or inlay knit technique for integrating the light transmissive yarn 2 into the knitted textile formed with a combination of base yarns 6 and stretch yarns 4.

The light transmissive yarn may be an optical fiber yarn 2. The optical fiber may be glass or plastic. The optical fiber may be sheathed or unsheathed. Sheathed fibers may be preferred because sheathing an optical fiber protects the fiber and blocks or reduces ambient or stray light from escaping the fiber, which may degrade the appearance of the fabric. Plastic optical fibers may be preferred because they are typically more flexible than glass fibers.

Figure 10:
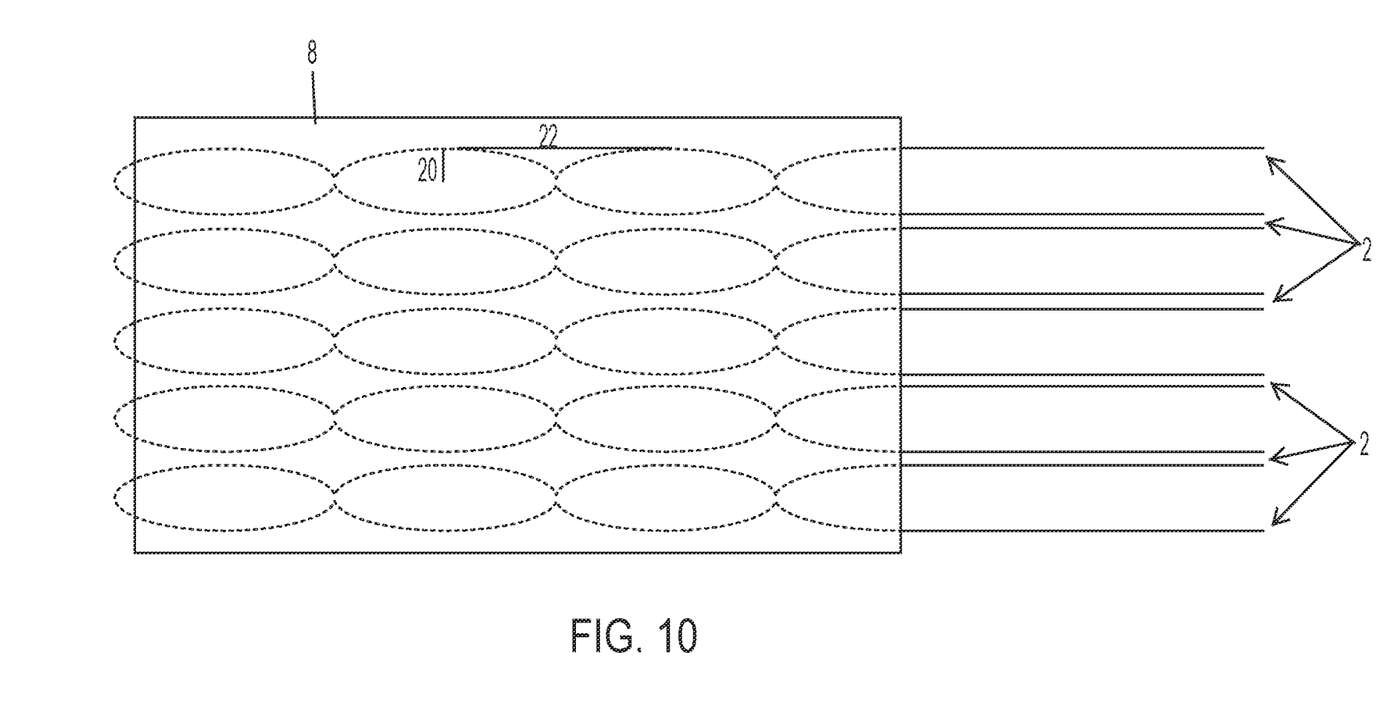
FIG. 10 depicts a schematic showing a light transmissive fiber optic yarn integrated into a fabric and depicting the bending angle area in accordance with an embodiment of the invention.

Furthermore, the additional flexibility permits an increased bending angle of the fiber optic cable. In particular, the plastic optical fiber cables may bend in two locations, as further depicted with reference to FIG. 10. First, the plastic optical fibers 2 are integrated into the knit textile 8. The overall knit textile 8 can create either a straight inlay pattern or wave inlay pattern for the plastic optical fibers as integrated into the textile. For the wave inlay pattern as depicted in FIG. 10, the plastic optical fiber yarns 2 have a bending curve and 'wave dimensions,' defined by wave height 20, measured in number of rows up or down the knit textile and a wavelength 22, measured by the number of needles. (For purposes of these measurements, a standard knitting machine needle bed has the needle rows spaced 3.6 mm apart. The spacing of the needles within the row is based on a gauge, wherein the gauge number defines the number of needles per inch. So, a 14-gauge knitting machine means that the needles within a row are spaced such that there are 14 needles per inch, or approximately 14 mm. The products and methods described in this disclosure were performed on a 14-gauge knitting machine. The wavelength and wave height may be calculated in absolute measurements from the row and needle values given and converted for use with other knitting machines that use a nonstandard row distance or a different needle gauge.) This knitted construction "wave" may have a minimum wave height of 6 rows and a minimum wavelength of 12 needles. The maximum wave height and wavelength may be determined by the parameters of the knitting machine itself. For example, on a knitting machine having 156 rows and 650 needles, these would be the maximum wave height and wavelength. In some embodiments, the plastic optical fiber cable or yarn has a wave height of 8-14 rows and a wavelength of 8-12 needles. The increase in wave height and decrease in wavelength makes the overall fiber optic cable curve denser. The increased density increases the overall brightness and/or illumination of the light passing through the cable and the resulting display.

A bend occurs at the end of the fabric, wherein the plastic optical fiber cable's orientation is turned an approximate 180 degrees and pass back through the knit fabric. This plastic optical fiber bend and the resulting distance between the two lengths of fiber optic cable or yarn within the fabric is limited by the bending radius of the fiber optic cable executing this 180-degree turn.

The optical fiber yarn 2 may be selected based on its luminance in order to satisfy industry standards or requirements for luminescent fabrics. These standards may be different based on the nature of the production of the intended use of the fabric. For example, highly luminescent clothing may be required by safety standards for transportation workers, rail workers, or other contexts where high visibility clothing is necessary. Such standards include ANSI/ISEA 107, Regulation (EU) 2016/425, AS/NZS 4602.1:L2011, and ISO 20471. On the other hand, luminescent fabrics may be desired for aesthetic, ornamental, or novelty purposes, which do not need to meet a certain brightness standard. The luminance may be determined using a standard light meter or lux meter.

The complementary stretch yarn 4 may be a natural, synthetic, or semi-synthetic yarn having a high elasticity, such as elastane, spandex, LYCRA®, nylon, LYCRA® or nylon blends, cotton or wool blends, etc. Complementary base yarn 6 is shown in rows 5 and 6. The complementary base yarn 6 may be a natural, synthetic, or semi-synthetic yarn typically used for fabric bases, such as polyester.

Figure 2:
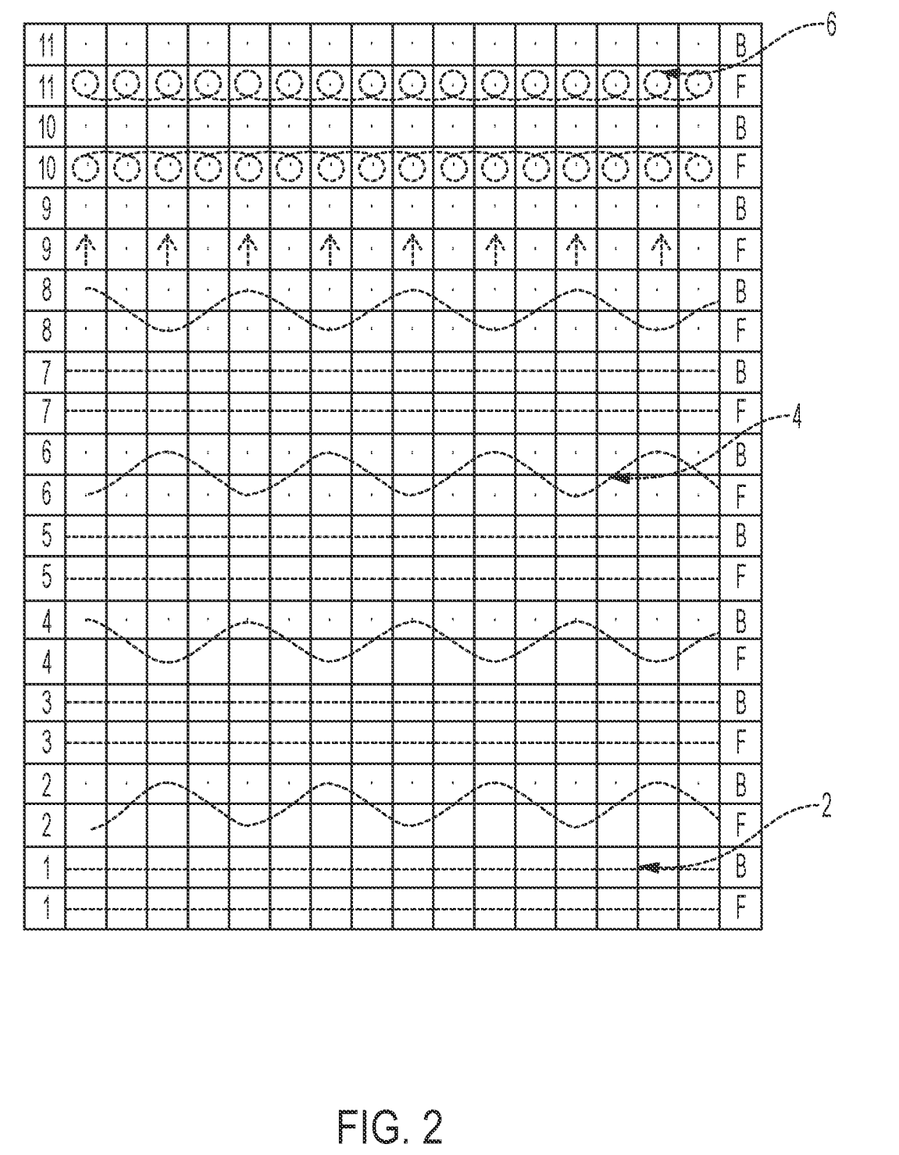
FIG. 2 depicts a knit diagram for another embodiment of a textile having an integrated light-transmissive yarn or fiber optic yarn.

FIG. 2 depicts a variation of the weave-in or inlay knit construction as seen in FIG. 1 for integrating the light transmissive, plastic optical fiber cable, into a knitted textile. In FIG. 2, the single transfer motion is sequenced ahead of applying the complementary base yarn. In addition, in FIG. 2, there are four sets of fiber optic yarn rows and complementary stretch yarn rows.

Figure 3:
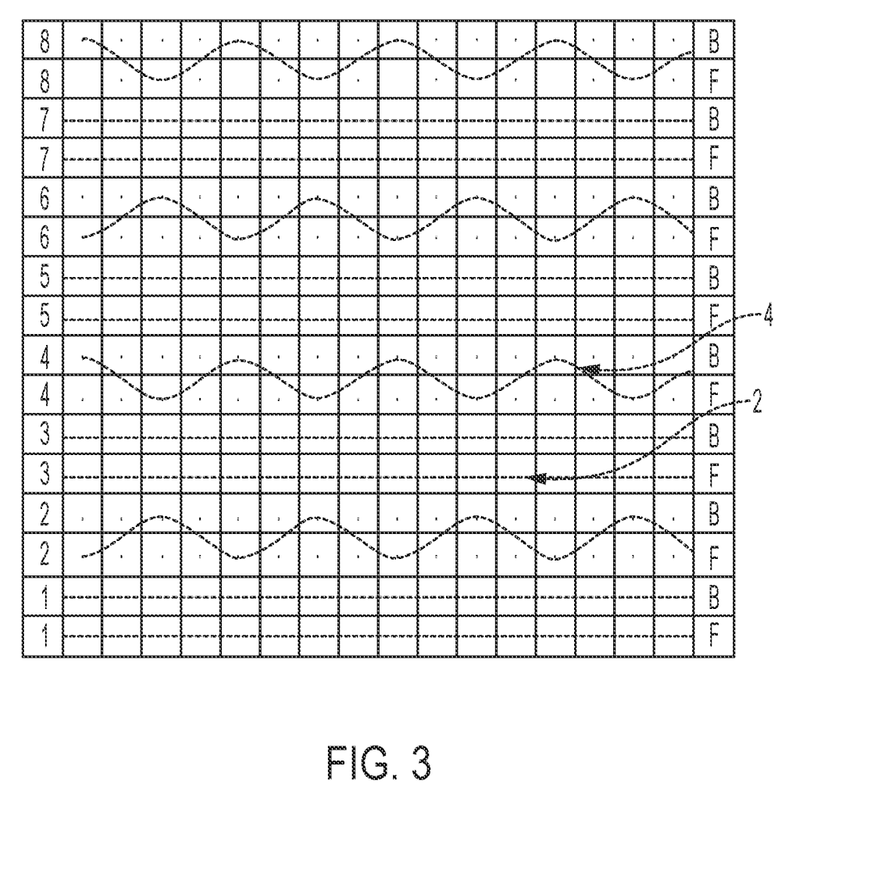
FIG. 3 depicts a knit diagram for the embodiment of FIG. 2 of a textile having an integrated light-transmissive yarn or fiber optic yarn.

FIG. 3 depicts the same alternation of weave-in or inlay knit construction for the fiber optic yarn 2 and the complementary stretch yarn 4 as shown in FIG. 2, except without a base yarn and without transfer motion.

Figure 4:
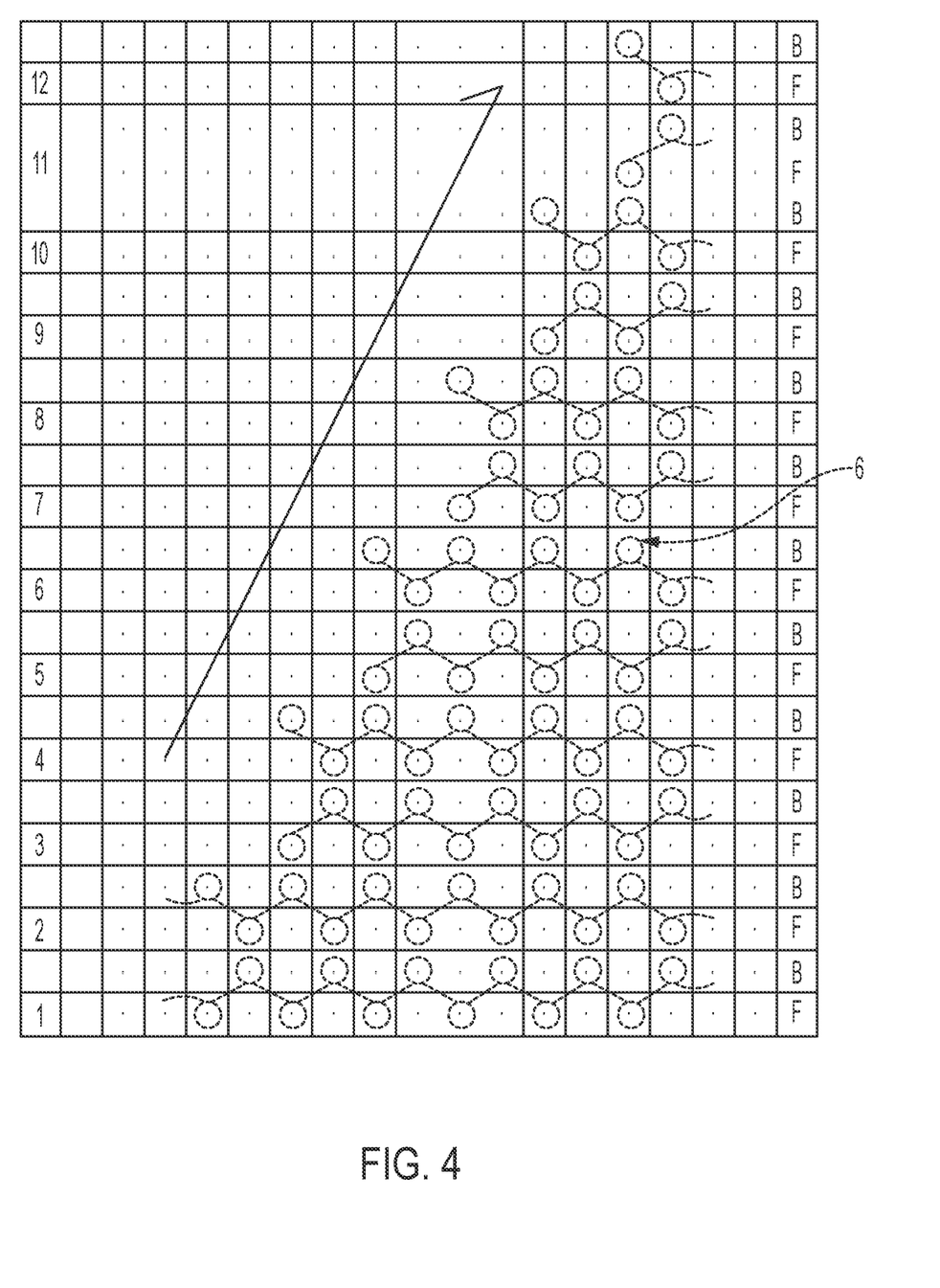
FIG. 4 depicts a knit diagram for the embodiment of FIG. 2 of a textile having an integrated light-transmissive yarn or fiber optic yarn.

FIG. 4 depicts the same fabric as shown in FIG. 2 but shows only the goring for the complementary base yarn 6.

Figure 5:
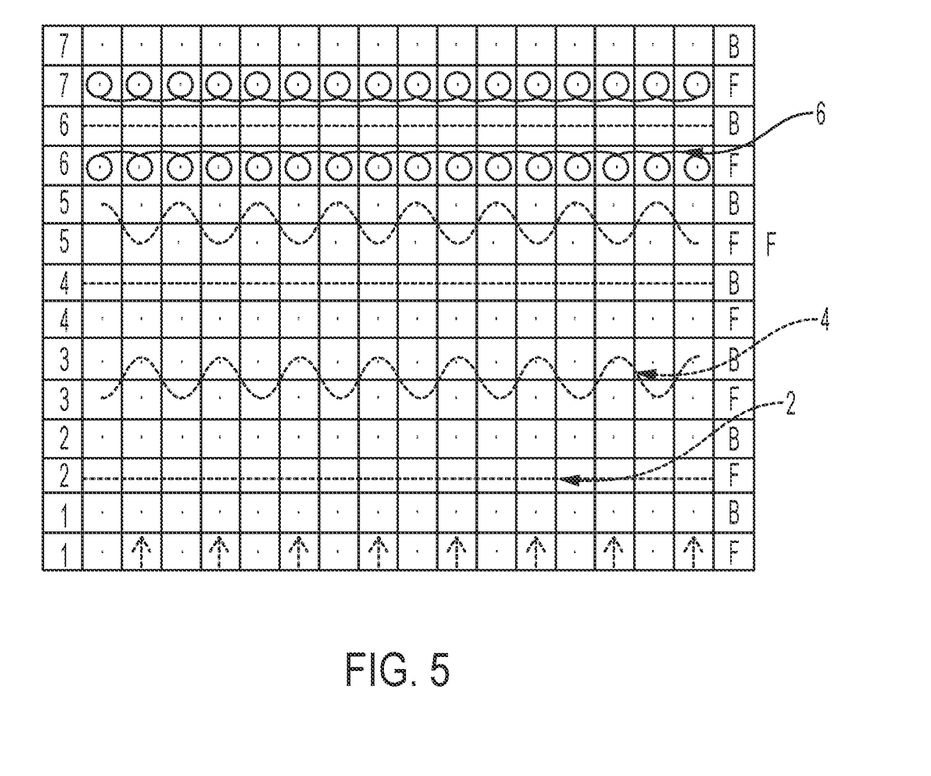
FIG. 5 depicts a knit diagram for another embodiment of a textile having an integrated light-transmissive yarn or fiber optic yarn.

FIG. 5 depicts a double bed knitting technique for producing a weave-in or inlay knitting construction. This depicts the same weave-in/inlay knit variation construction as seen in FIG. 2, except that it is transferring the complementary base yarn 6 from the front needle bed to the back needle bed. The light transmissive fiber optic yarn 2 feeds in with a direct weave-in motion. In some embodiments. The front and back surface of the knit textile is linked together by Yarn 4 in an alternative needle arrangement.

Figure 11:
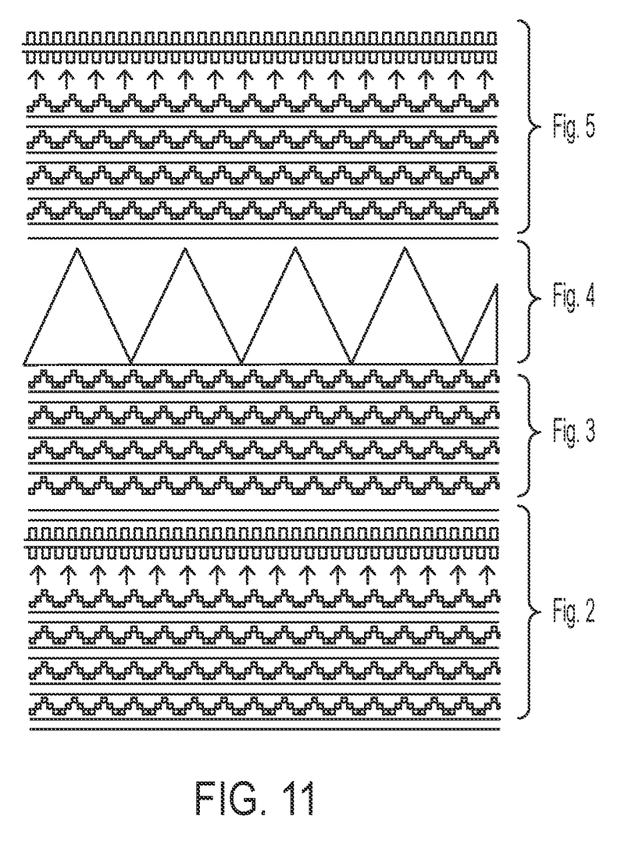
FIG. 11 is a knit programming view for performing the knit actions depicted in FIGS. 2-5 combining the knit diagrams for one full repeat of knit stitches to construct the wave inlay knit pattern.

FIG. 11 depicts the wave inlay knit construction presented in FIGS. 2-5 in a knit programming view. The overall wave inlay knit construction is a combination of previous knit construction diagrams as depicted in FIGS. 2-5. The portion of the knit programming view shown in FIG. 11 that corresponds to Figure each of FIGS. 2-5 is marked on FIG. 11. The programmed combination of all FIGS. 2-5 as shown in FIG. 11 is one full repeat of knit stitches to construct the wave inlay knit pattern.

Figure 6A:
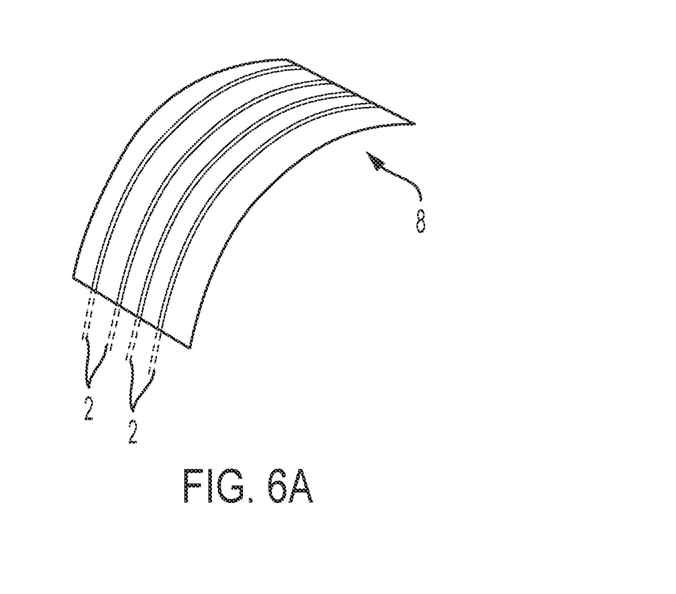
FIGS. 6A-6C depict a finished textile shown in successive layers in and having integrated light-transmissive yarns.
Figure 6B:
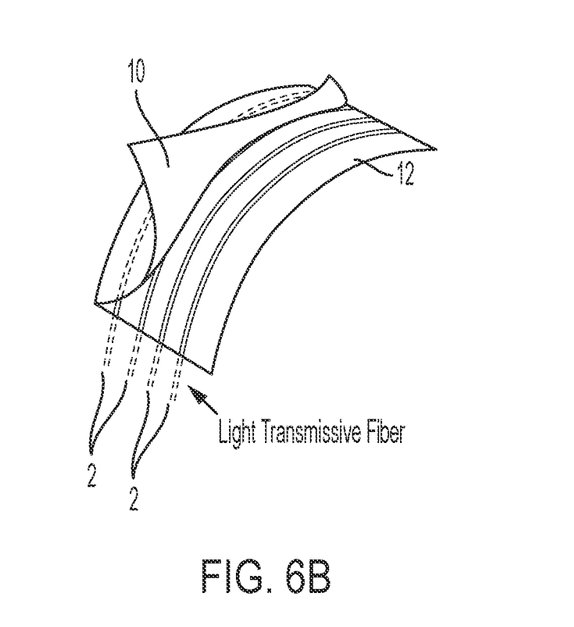
Figure 6C:
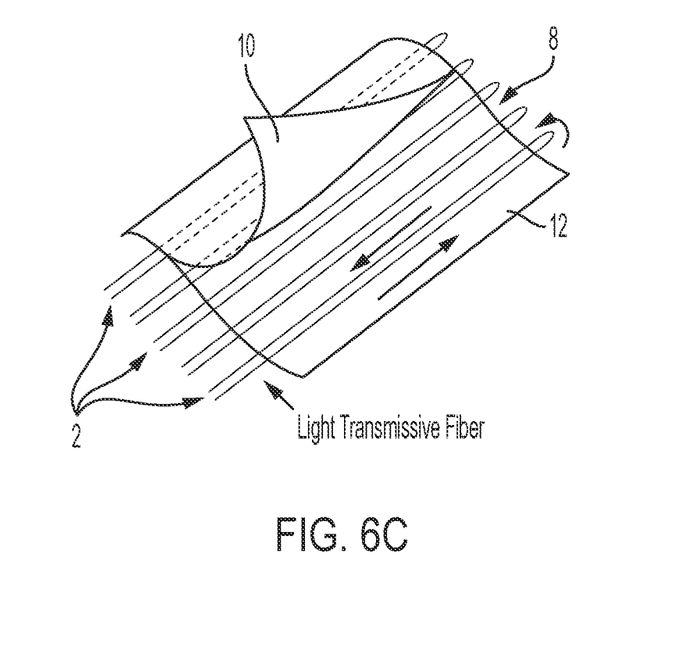

FIGS. 6A-6C depict the positioning of multiple fiber optic yarns 2 within a knit construction for a textile. In FIG. 6A the fiber optic yarn is depicted as integrated within the textile. FIG. 6A features the front face of the fiber optic (light transmissive fiber) integrated knit textile 8. The fiber optic yarn is shown terminating out of the bottom of the knit textile 8. In FIG. 6B, the fiber optic knit textile shows the different layers of the textile, which includes: a top knit layer 10, with integration of the fiber optic yarn 2 in the middle, and a bottom knit layer 12. The fiber optic yarn passes between the front layer and back layer. In FIG. 6C, the arrows show the knitting direction of the weave-in or inlay action described with respect to FIGS. 1-5, to indicate how the fiber optic yarn 2 is integrated within the knit textile 8.

Figure 7A:
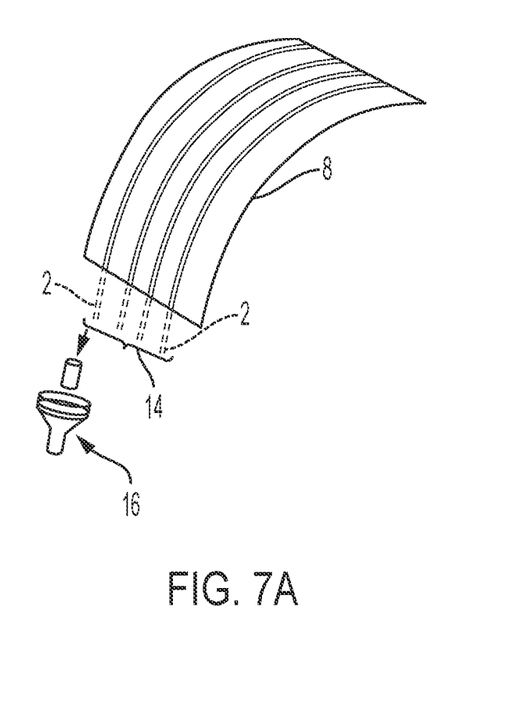
FIGS. 7A-7B depict multiple fiber optic yarn bundles arranged within a textile.
Figure 7B:
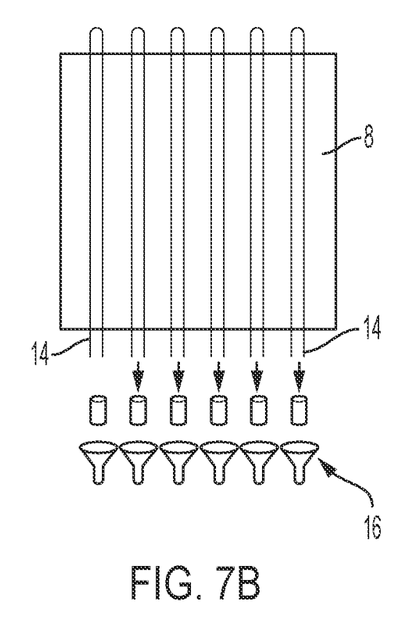

FIGS. 7A and 7B also depict multiple fiber optic yarn bundles 14 arranged within a textile 8. The ends of each fiber optic yarn 2 extend out the bottom of the sample textile 8. A light source 16 is arranged to provide light to each fiber optic yarn strand 2. The light source 16 permits light to pass through the yarn 2 and to glow or to display light along the yarn 2 as it is integrated into the textile 8. The fiber optic yarns 2 may be arranged or combined into a single bundle 14 that is lit by one or more light sources 16. The light source 16 may be any appropriate light generating device for providing light to the yarns, e.g., an incandescent light, a fluorescent light, or a laser. The end of the bundle 14 may be connected to a connector 18 that attaches or is attachable to the light source 16. Such a connection can efficiently direct the light provided by the light source 16 into the bundle 14 of light transmissive fiber optic yarns 2. The light source may be powered by a power source. The power source is preferably portable, such as a battery, that can provide power for a period of time. Such a portable power source may be replaceable or rechargeable.

Figure 8A:
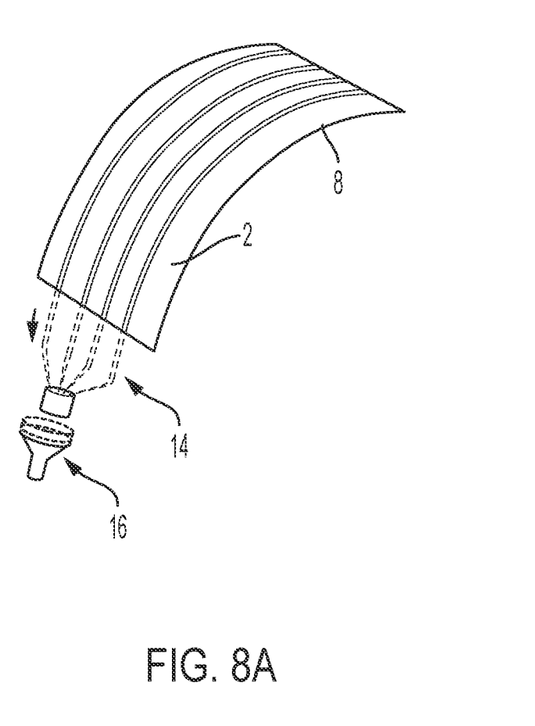
FIGS. 8A-8B depict multiple fiber optic yarns in a single-bundle arrangement.
Figure 8B:
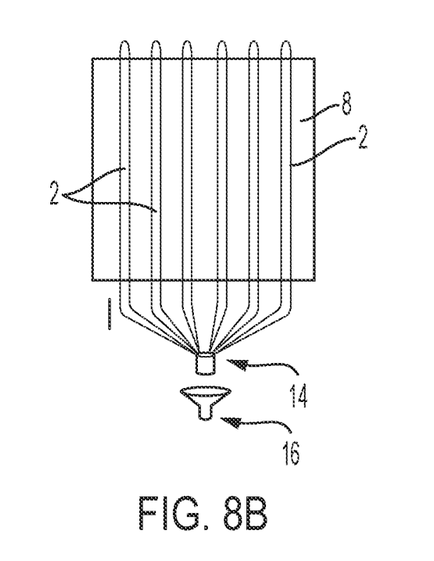

FIGS. 8A and 8B depict a single-bundle arrangement, in which each of the fiber optic yarns 2 are gathered into a single bundle 14 to be lit by a single light source 16.

Figure 9A:
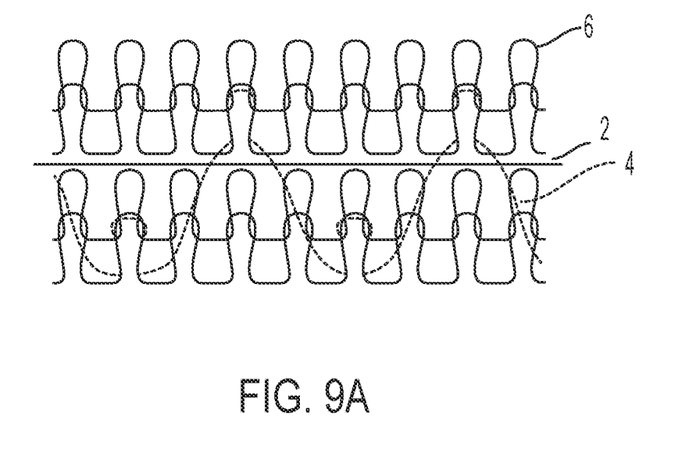
FIGS. 9A and 9B depict knit structures of the type described herein with a light transmissive fiber optic yarn inlaid between the complementary yarns.
Figure 9B:
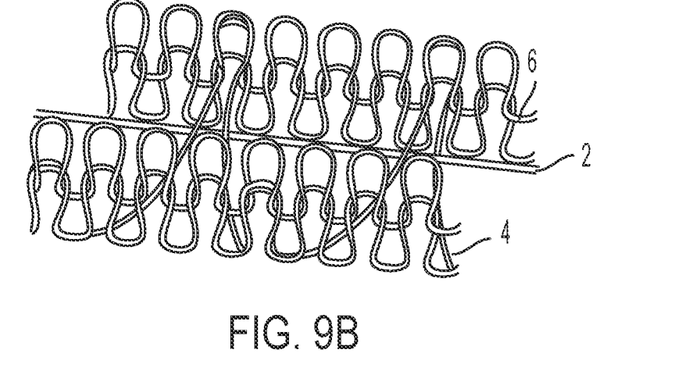

FIGS. 9A and 9B depict knit structures of the type described herein with a light transmissive fiber optic yarn 2 inlaid between the complementary yarns.

The devices and methods described herein have at least the following advantages. The device provides a fabric having a light-transmissive fiber optic yarn integrated into the fabric, such that a portion of the fabric itself can display a design, figure, image, or words when connected to a light source. The one or more light-transmissive fiber optic yarns can be connected to one or more light sources using a connector. The light source can be powered by a portable power source such as a battery. A light-transmissive fabric may be used in place of other designs that require cables externally attached to a non-light-transmissive fabric.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

We claim:

1. A textile comprising:
   a plurality of yarns knitted into a fabric, the plurality of yarns further comprising at least one light-transmissive fiber defining a light transmissive portion of the fabric; and
   a connection for connecting a light source to provide light to the at least one light-transmissive fiber.

2. The textile of claim 1, wherein the light-transmissive fiber has a wave height between 6 and 12 rows on a knitting machine having standard knitting rows.

3. The textile of claim 1, wherein the light-transmissive fiber has a wavelength between 8-14 needles on a 14-gauge knitting machine.

4. The textile of claim 1, wherein the light-transmissive fiber has a wave height between 6 and 156 rows, and a wavelength between 12 and 156 needles on a 14-gauge knitting machine.

5. The textile of claim 1, wherein textile has multiple light transmissive fibers, each fiber having an end, wherein the fiber ends are gathered into at least one bundle, and each bundle is connectable to a single light source.

6. A textile comprising:
   a plurality of yarns knitted into a fabric, the plurality of yarns further comprising at least one light-transmissive yarn, at least one complementary base yarn having an end, and at least one complementary stretch yarn defining a light transmissive portion of the fabric; and
   a connection attached to the end of the at least one light-transmissive yarn for connecting a light source to provide light to the at least one light-transmissive yarn.

7. The textile of claim 6, further including a light source connected to the connection.

8. The textile of claim 7, further including a power source for providing power to the light source.

9. The textile of claim 8 further comprising a plurality of light-transmissive yarns, each of the plurality of light-transmissive yarns having an end, wherein the ends are bundled together into the connector.

10. A method of manufacturing a textile on a flatbed knitting machine having an array of array of horizontal needle beds arranged to knit a plurality of yarns integrated with a weave-in or inlay knit technique, comprising:
    a) arranging a fiber optic yarn as the first and third rows of yarns;
    b) arranging a complementary stretch yarn as the second and fourth rows of yarns;
    c) arranging a complementary base yarn as the fifth and sixth rows of yarns; and
    d) operating the flat-bed knitting machine using a single transfer motion to integrate the plurality of yarns to form a textile.

* * * * *